United States Patent
Hou et al.

(10) Patent No.: US 10,187,624 B2
(45) Date of Patent: Jan. 22, 2019

(54) DISPLAY METHOD FOR INSERTING PART OF SUCCESSIVE MONOCULAR FRAME IMAGE SIGNALS AND PART OF SUCCESSIVE BLACK PICTURE IMAGE SIGNALS IN IMAGE FRAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Shuai Hou, Beijing (CN); Liang Zhang, Beijing (CN); Bin Zhang, Beijing (CN); Shulin Yao, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 479 days.

(21) Appl. No.: 14/398,662

(22) PCT Filed: Mar. 18, 2014

(86) PCT No.: PCT/CN2014/073580
§ 371 (c)(1),
(2) Date: Nov. 3, 2014

(87) PCT Pub. No.: WO2015/070553
PCT Pub. Date: May 21, 2015

(65) Prior Publication Data
US 2015/0365648 A1 Dec. 17, 2015

(30) Foreign Application Priority Data
Nov. 13, 2013 (CN) .......................... 2013 1 0572102

(51) Int. Cl.
*H04N 13/00* (2018.01)
*H04N 13/133* (2018.01)
(Continued)

(52) U.S. Cl.
CPC ......... *H04N 13/133* (2018.05); *H04N 13/161* (2018.05); *H04N 13/189* (2018.05);
(Continued)

(58) Field of Classification Search
CPC .. H04N 13/133; H04N 13/189; H04N 13/341; H04N 13/161; H04N 13/261; H04N 13/398
(Continued)

(56) References Cited

U.S. PATENT DOCUMENTS 8,704,883 B2 * 4/2014 Lee ..................... G02B 27/225
348/42
8,970,684 B2 * 3/2015 Kim ....................... G09G 3/342
348/56
(Continued)

FOREIGN PATENT DOCUMENTS

| CN | 102196290 A | 9/2011 |
|----|-------------|--------|
| CN | 102263974   | 11/2011 |

(Continued)

OTHER PUBLICATIONS

Text of the Notification of the First Office Action, App. No. 2013105721026, dated Jan. 6, 2015.
(Continued)

*Primary Examiner* — Gims S Philippe
*Assistant Examiner* — Stefan Gadomski
(74) *Attorney, Agent, or Firm* — Brooks Kushman P.C.

(57) ABSTRACT

The method of the subject invention for processing a shutter-type 3D image display comprising the steps of: receiving each frame of image signal to be displayed, processing each received frame of an image signal to generate a corresponding 3D image signal sequence that includes monocular frame image signals; generating a monocular frame mixed image signal corresponding to each monocular frame image
(Continued)

signal according to a gate line scanning direction of a display device; inserting a corresponding monocular frame mixed image signal after the monocular frame image signal in the 3D image signal sequence to generate a new 3D image signal sequence; and sending the new 3D image signal sequence to the display device.

14 Claims, 3 Drawing Sheets

(51) Int. Cl.
    *H04N 13/189* (2018.01)
    *H04N 13/261* (2018.01)
    *H04N 13/341* (2018.01)
    *H04N 13/398* (2018.01)
    *H04N 13/161* (2018.01)

(52) U.S. Cl.
    CPC ......... *H04N 13/261* (2018.05); *H04N 13/341* (2018.05); *H04N 13/398* (2018.05)

(58) Field of Classification Search
    USPC .......................................................... 348/56
    See application file for complete search history.

(56) References Cited

U.S. PATENT DOCUMENTS

| | | | | |
|---|---|---|---|---|
| 9,158,961 | B2* | 10/2015 | D'Amato | G06K 9/00201 |
| 2005/0041736 | A1* | 2/2005 | Butler-Smith | H04N 13/004 |
| | | | | 375/240.01 |
| 2005/0128584 | A1* | 6/2005 | Shulman | H04N 13/341 |
| | | | | 359/462 |
| 2006/0284972 | A1* | 12/2006 | Aoki | G02F 1/136213 |
| | | | | 348/51 |
| 2007/0008406 | A1* | 1/2007 | Shestak | G02B 27/2214 |
| | | | | 348/58 |
| 2010/0238274 | A1* | 9/2010 | Kim | H04N 13/341 |
| | | | | 348/51 |
| 2010/0289974 | A1 | 11/2010 | Kim et al. | |
| 2011/0018983 | A1* | 1/2011 | Kim | G02B 27/2264 |
| | | | | 348/56 |
| 2011/0090308 | A1* | 4/2011 | Chen | G09G 3/003 |
| | | | | 348/43 |
| 2011/0090320 | A1* | 4/2011 | Tsuchida | G02B 27/2264 |
| | | | | 348/51 |
| 2011/0221747 | A1* | 9/2011 | Kim | H04N 13/0438 |
| | | | | 345/419 |
| 2011/0228048 | A1 | 9/2011 | Wei et al. | |
| 2012/0001956 | A1* | 1/2012 | Sato | H04N 13/0409 |
| | | | | 345/690 |
| 2012/0038691 | A1* | 2/2012 | Lee | H04N 13/0452 |
| | | | | 345/691 |
| 2012/0044333 | A1* | 2/2012 | Kang | G09G 3/3406 |
| | | | | 348/56 |
| 2012/0113168 | A1* | 5/2012 | Seo | G09G 3/003 |
| | | | | 345/691 |
| 2012/0236130 | A1* | 9/2012 | Ishii | H04N 13/0438 |
| | | | | 348/51 |
| 2012/0242657 | A1* | 9/2012 | Asano | G09G 3/003 |
| | | | | 345/419 |
| 2012/0249525 | A1* | 10/2012 | Ahn | H04N 13/0438 |
| | | | | 345/419 |
| 2013/0027387 | A1* | 1/2013 | Hsiao | H04N 13/341 |
| | | | | 345/419 |
| 2013/0082999 | A1* | 4/2013 | Ahn | G09G 3/003 |
| | | | | 345/212 |
| 2013/0088506 | A1* | 4/2013 | Yun | G09G 3/3648 |
| | | | | 345/589 |
| 2013/0207968 | A1* | 8/2013 | Liu | G09G 5/14 |
| | | | | 345/419 |
| 2013/0308068 | A1* | 11/2013 | Xing | G02B 27/2228 |
| | | | | 349/15 |
| 2014/0078269 | A1* | 3/2014 | Jo | H04N 13/122 |
| | | | | 348/55 |
| 2014/0168281 | A1* | 6/2014 | Ahn | G09G 3/3648 |
| | | | | 345/690 |
| 2014/0333736 | A1* | 11/2014 | Hung | H04N 13/0497 |
| | | | | 348/54 |

FOREIGN PATENT DOCUMENTS

| | | |
|---|---|---|
| CN | 102316332 | 1/2012 |
| CN | 102387375 A | 3/2012 |
| CN | 102572480 A | 7/2012 |
| CN | 102647609 | 8/2012 |
| CN | 103002308 A | 3/2013 |
| CN | 103051912 | 4/2013 |
| CN | 103051914 A | 4/2013 |
| CN | 103595995 A | 2/2014 |

OTHER PUBLICATIONS

International Search Report and Written Opinion in PCT International Application No. PCT/CN2014/073580, dated Aug. 4, 2014.

\* cited by examiner

−PRIOR ART−

− PRIOR ART−

DISPLAY METHOD FOR INSERTING PART OF SUCCESSIVE MONOCULAR FRAME IMAGE SIGNALS AND PART OF SUCCESSIVE BLACK PICTURE IMAGE SIGNALS IN IMAGE FRAME

CROSS-REFERENCE TO RELATED APPLICATION

This application is the U.S. national phase of PCT Application No. PCT/CN2014/073580 filed on Mar. 18, 2014, which claims priority to Chinese Patent Application No. 201310572102.6 filed on Nov. 13, 2013, the disclosures of which are incorporated in their entirety by reference herein.

TECHNICAL FIELD

The embodiments of the present invention relate to the field of three-dimensional display technology, and in particular to a method, device, system, computer program and computer readable storage medium for processing shutter-type three-dimensional image display.

BACKGROUND

With the development of display technology, three-dimensional (3D) stereo display technology has become one of the important technologies used in a display device. Active shutter-type 3D display technology is a 3D display technology that can be implemented at a low cost. Active shutter-type 3D display technology achieves 3D effect by increasing the refresh rate of images and meanwhile by the aid of rapid switch of 3D glasses, thereby allowing a viewer's eyes to watch corresponding left-eye and right-eye images, and thus producing the stereoscopic effect.

Although the active shutter-type 3D display method can display 3D images, there are problems of left-eye and right-eye image crosstalk phenomenon, 3D image blurring and the like due to vision duration effect, which severely affects the 3D viewing effect. In the prior art, the crosstalk phenomenon of 3D images is generally reduced by a method of inserting a black frame, or a method inserting the image of a previous frame (i.e., continuously giving images of two same frames).

The method of inserting a black frame is mainly characterized in that inserting a black picture between display of a left-eye image and display of a right-eye image. That is, during the process of displaying a frame of a 3D image, a display device 01 displays a left-eye image L, a black picture B, a right-eye image R and a black picture B in sequence, as shown in FIG. 1. Meanwhile, in cooperation with the control on a backlight module 02, the backlight module is turned on respectively when the left-eye image and the right-eye image are displayed; the backlight module is turned off when the black pictures are displayed. In addition, with the aid of rapid switch of 3D glasses 03, a left lens is turned on and a right lens is turned off when the left-eye image is displayed, whereas the left lens is turned off and a right lens is turned on when the right-eye image is displayed. Both of the left lens and right lens are turned off when the black pictures are displayed.

The above method can reduce the crosstalk of 3D images to some extent, however since deflection of liquid crystal molecules in the display device needs a certain time for response, the liquid crystal molecules in the upper portion of the display device have already started to rotate when the display device starts to display the black picture after displaying the left-eye and right-eye images, thus causing the picture to get black gradually. Whereas at the same time, since the liquid crystal molecules in the lower portion of the display device have not rotated yet, the picture still remains in the image of the last frame. On the other hand, when the display device starts to display the right(left)-eye image after displaying the black picture, the liquid crystal molecules in the upper portion of the display device have already started to rotate, causing the picture to gradually become the right(left)-eye image. Whereas at the same time, since the liquid crystal molecules in the lower portion of the display device have not rotated yet, the picture still remains in the black picture. This will result in unevenness of the brightness distribution of the whole display device.

Therefore, although the above method of inserting a black frame can reduce crosstalk to certain extent, it will degrade the evenness of brightness of the display device, and thus deteriorate the display quality.

Additionally, the method of inserting the image of the previous frame is mainly characterized in that inserting the image of the previous frame respectively after display of the left-eye image and the display of the right-eye image. That is, during the process of displaying a frame of a 3D image, the display device 01 displays a first frame of left-eye image L1, a second frame of left-eye image L2, a first frame of right-eye image R1, and a second frame of right-eye image R2 in sequence, as shown in FIG. 2. Meanwhile, 3D image display is realized with the aid of rapid switch of the 3D glasses 03 and control on the backlight module 02.

When the above method is used for display, it needs to control the turn-on time of the backlight module. Supposing that the display device scans in a top-to-bottom manner, if the backlight module is turned on at the time of displaying the first frame of left(right)-eye image, the liquid crystal in the upper portion of the display device has completed rotation, the upper portion of the display device displays the first frame of left(right)-eye image. Whereas at the same time, since the rotation of the liquid crystal in the lower portion of the display device is not quick enough, the liquid crystal in the lower portion does not complete rotation yet. Therefore, crosstalk of the image of the last frame will be introduced into the lower portion of the display device. Therefore the crosstalk value of the lower portion of the display device will be large. On the other hand, if the backlight module is turned on at the time of displaying the second frame of left(right)-eye image, when the liquid crystals in the lower portion of the display device have all completely rotated, although crosstalk will not be introduced into the lower portion of the display device (because its image of the last frame is exactly the same as the image of this frame), the upper portion of the display device has started to be filled with the image of the next frame. Therefore the image of the next frame is introduced into the upper portion of the display device, causing the crosstalk value of the upper portion of the display device to be large.

Accordingly, although the evenness of the brightness of the display device is better when the above method of inserting the image of the previous frame is used, the image crosstalk value is still very large.

In conclusion, it is a problem urgently to be solved by a person skilled in the art to ensure both good brightness evenness of the display device and smaller image crosstalk value during display when realizing 3D display.

SUMMARY

(I) Technical Problems

An embodiment of the present invention provides a method, device, system, computer program and computer readable storage medium for processing shutter-type three-dimensional image display so as to decrease the crosstalk value of the image during three-dimensional image display on the premise of ensuring good brightness evenness of the display device.

(II) Technical Solutions

An embodiment of the present invention provides a method for processing shutter-type three-dimensional image display of a display device, which may include:

receiving each frame of image signal to be displayed, and processing the received each frame of image signal to generate a corresponding three-dimensional image signal sequence that includes monocular frame image signals;

generating a monocular frame mixed image signal corresponding to each monocular frame image signal according to a gate line scanning direction of the display device, wherein the monocular frame mixed image signal includes a part of successive monocular frame image signals and a part of successive black picture image signals;

inserting a corresponding monocular frame mixed image signal after the monocular frame image signal in the three-dimensional image signal sequence to generate a new three-dimensional image signal sequence; and sending the new three-dimensional image signal sequence to the display device for display.

In the above processing method provided in the embodiment of the present invention, as compared with the current processing method, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Preferably, for the purpose of facilitating implementation, in the above processing method provided in the embodiment of the present invention, the step of generating a monocular frame mixed image signal corresponding to each monocular frame image signal according to a gate line scanning direction of the display device may specifically include:

combining the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal.

Here, M may be a number of gate lines in the display device, and N may be a positive integer greater than or equal to 1 and smaller than M.

Preferably, for the purpose of facilitating implementation, in the above processing method provided in the embodiment of the present invention, a value of N may be determined according to an actual crosstalk value and an actually required brightness evenness value of the display device.

Preferably, for the purpose of facilitating implementation, the above processing method provided in the embodiment of the present invention may further include:

determining a shutter glasses control signal according to the new three-dimensional image signal sequence, the shutter glasses control signal being used for controlling on-off state of shutter glasses.

Preferably, for the purpose of facilitating implementation, the above processing method provided in the embodiment of the present invention may further include:

determining a backlight module control signal according to the new three-dimensional image signal sequence, the backlight module control signal being used for controlling a turning-on time and a turning-on width of a sparkling backlight module in the display device.

Preferably, for the purpose of facilitating implementation, in the above processing method provided in the embodiment of the present invention, the monocular frame mixed image signal may only include a part of the successive monocular frame image signals and a part of the successive black picture image signals.

Moreover, a corresponding monocular frame mixed image signal may be inserted immediately after the monocular frame image signal in the three-dimensional image signal sequence.

An embodiment of the present invention further provides a device for processing shutter-type three-dimensional image display of a display device, which may include:

a receiving unit for receiving each frame of image signal to be displayed;

a pre-processing unit for processing the received each frame of image signal to generate a corresponding three-dimensional image signal sequence that includes monocular frame image signals;

a processing unit for generating a monocular frame mixed image signal corresponding to each monocular frame image signal according to a gate line scanning direction of the display device, wherein the monocular frame mixed image signal includes a part of successive monocular frame image signals and a part of successive black picture image signals;

an image generating unit for inserting a corresponding monocular frame mixed image signal after the monocular frame image signal in the three-dimensional image signal sequence to generate a new three-dimensional image signal sequence; and a sending unit for sending the new three-dimensional image signal sequence to the display device for display.

In the above processing device provided in the embodiment of the present invention, as compared with the current processing device, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Preferably, for the purpose of facilitating implementation, in the above processing device provided in the embodiment of the present invention, the processing unit may be specifically used to:

combine the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal, Here, M may be a number of gate lines in the display device, and N may be a positive integer greater than or equal to 1 and smaller than M.

Preferably, for the purpose of facilitating implementation, in the above processing device provided in the embodiment of the present invention, a value of N may be determined according to an actual crosstalk value and an actually required brightness evenness value of the display device.

Preferably, for the purpose of facilitating implementation, the above processing device provided in the embodiment of the present invention may further include:

a shutter glasses control unit used for determining a shutter glasses control signal according to the new three-dimensional image signal sequence, the shutter glasses control signal being used for controlling on-off state of shutter glasses.

Preferably, for the purpose of facilitating implementation, the above processing device provided in the embodiment of the present invention may further include:

a backlight module control unit for determining a backlight module control signal according to the new three-dimensional image signal sequence, the backlight module control signal being used for controlling a turning-on time and a turning-on width of a sparkling backlight module in the display device.

Preferably, for the purpose of facilitating implementation, in the above processing device provided in the embodiment of the present invention, the monocular frame mixed image signal may only include a part of the successive monocular frame image signals and a part of the successive black picture image signals. Moreover, a corresponding monocular frame mixed image signal may be inserted immediately after the monocular frame image signal in the three-dimensional image signal sequence.

An embodiment of the present invention further provides a system for processing shutter-type three-dimensional image display of a display device, which may include:

a device for processing shutter-type three-dimensional image display used for receiving each frame of image signal to be displayed, and processing the received each frame of image signal to generate a corresponding three-dimensional image signal sequence that includes monocular frame image signals; generating a monocular frame mixed image signal corresponding to each monocular frame image signal according to a gate line scanning direction of the display device, wherein the monocular frame mixed image signal includes a part of successive monocular frame image signals and a part of successive black picture image signals; inserting a corresponding monocular frame mixed image signal after the monocular frame image signal in the three-dimensional image signal sequence to generate a new three-dimensional image signal sequence; and sending the new three-dimensional image signal sequence to the display device for display; and a display device used for receiving the new three-dimensional image signal sequence sent by the device for processing shutter-type three-dimensional image display, and displaying according to the new three-dimensional image signal sequence.

In the above system for shutter-type three-dimensional image display provided in the above embodiment, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Preferably, for the purpose of facilitating implementation, in the above system provided in the embodiment of the present invention, the monocular frame image signals corresponding to former N rows of gate lines along the gate line scanning direction may be combined with the black picture image signals corresponding to latter M−N rows of gate lines along the gate line scanning direction to generate the monocular frame mixed image signal corresponding to the monocular frame image signal.

Here, M may be a number of gate lines in the display device, and N may be a positive integer greater than or equal to 1 and smaller than M.

Preferably, for the purpose of facilitating implementation, in the above system provided in the embodiment of the present invention, a value of N may be determined according to an actual crosstalk value and an actually required brightness evenness value of the display device.

Preferably, for the purpose of facilitating implementation, the above system provided in the embodiment of the present invention may further include: shutter glasses;

the device for processing shutter-type three-dimensional image display may be further used to determine a shutter glasses control signal according to the new three-dimensional image signal sequence;

the shutter glasses may be used to receive the shutter glasses control signal sent by the device for processing shutter-type three-dimensional image display, and control on-off switch of left and right lenses of the shutter glasses according to the shutter glasses control signal.

Preferably, for the purpose of facilitating implementation, in the above system provided in the embodiment of the present invention, the device for processing shutter-type three-dimensional image display may be further used to determine a backlight module control signal according to the new three-dimensional image signal sequence;

the display device may be further used to receive the backlight module control signal sent by the device for processing shutter-type three-dimensional image display, and control a turning-on time and a turning-on width of a sparkling backlight module in the display device according to the backlight module control signal.

An embodiment of the present invention further provides a computer program used for implementing any one of the processing methods as above when a processor invokes and executes the computer program.

An embodiment of the present invention further provides a computer readable storage medium, in which the computer program described as above is stored.

(III) Beneficial Effects

In the above method, device, system, computer program and computer readable storage medium for processing shutter-type three-dimensional image display, as compared with the prior art, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

DESCRIPTION OF THE DRAWINGS

To illustrate embodiments of the present invention more clearly, the accompanying drawings for describing the embodiments are introduced briefly below. Apparently, the accompanying drawings in the following description are only some embodiments of the present invention, and persons of ordinary skill in the art can derive other drawings from the accompanying drawings without creative efforts.

SPECIFIC EMBODIMENTS

The specific embodiments of the present invention will be further described below with reference to the drawings and embodiments. The following embodiments are only used for describing the present invention, but not intended to limit the scope of the present invention.

In order to make the objectives, technical solutions, and advantages of the present invention clearer, the technical solutions of the embodiments of the present invention will be described clearly and completely below with reference to the accompanying drawings of the embodiments of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

Unless otherwise defined, all the technical and scientific terms used herein have the same meanings as commonly understood by one of ordinary skill in the art to which the present invention belongs. Terms such as "first," "second," etc., which are used in the description and the claims of the present application for invention, are not intended to indicate any sequence, amount or importance, but distinguish various components. Also, the terms such as "a," "an," "the," etc., are not intended to limit the amount, but indicate the existence of at least one. The phrases "connect", "connected", etc., are not intended to define a physical connection or mechanical connection, but may include an electrical connection, directly or indirectly. Terms such as "on," "under," "right," "left" and the like are only used to indicate relative position relationship, and when the position of the object which is described is changed, the relative position relationship may be changed accordingly.

The specific embodiments of the method, device and system for processing shutter-type three-dimensional image display provided in the examples of the present invention will be described below in detail with reference to the drawings.

The First Embodiment

Figure 1:
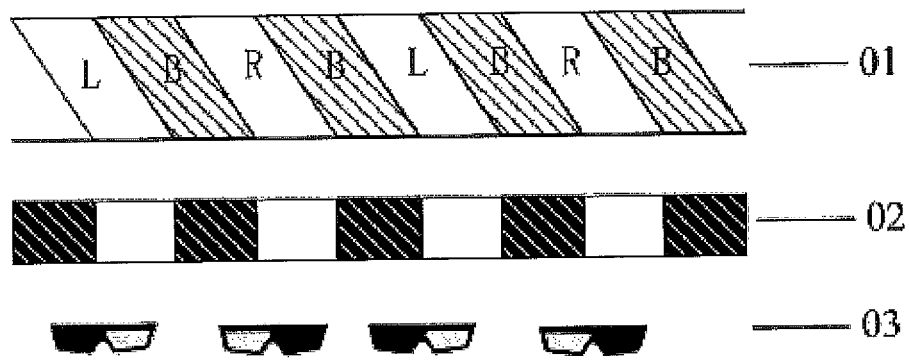
FIG. 1 is a sequence chart of images when a method of inserting a black frame is used for 3D display in the prior art.
Figure 2:
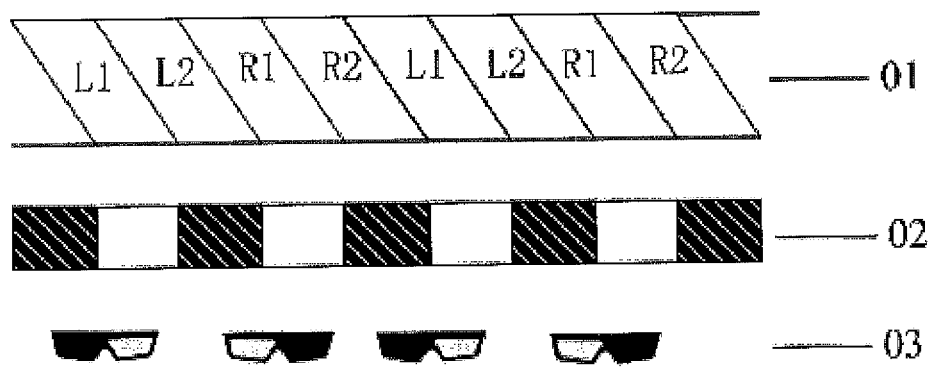
FIG. 2 is a sequence chart of images when a method of inserting an image of a previous frame is used for 3D display in the prior art.
Figure 3:
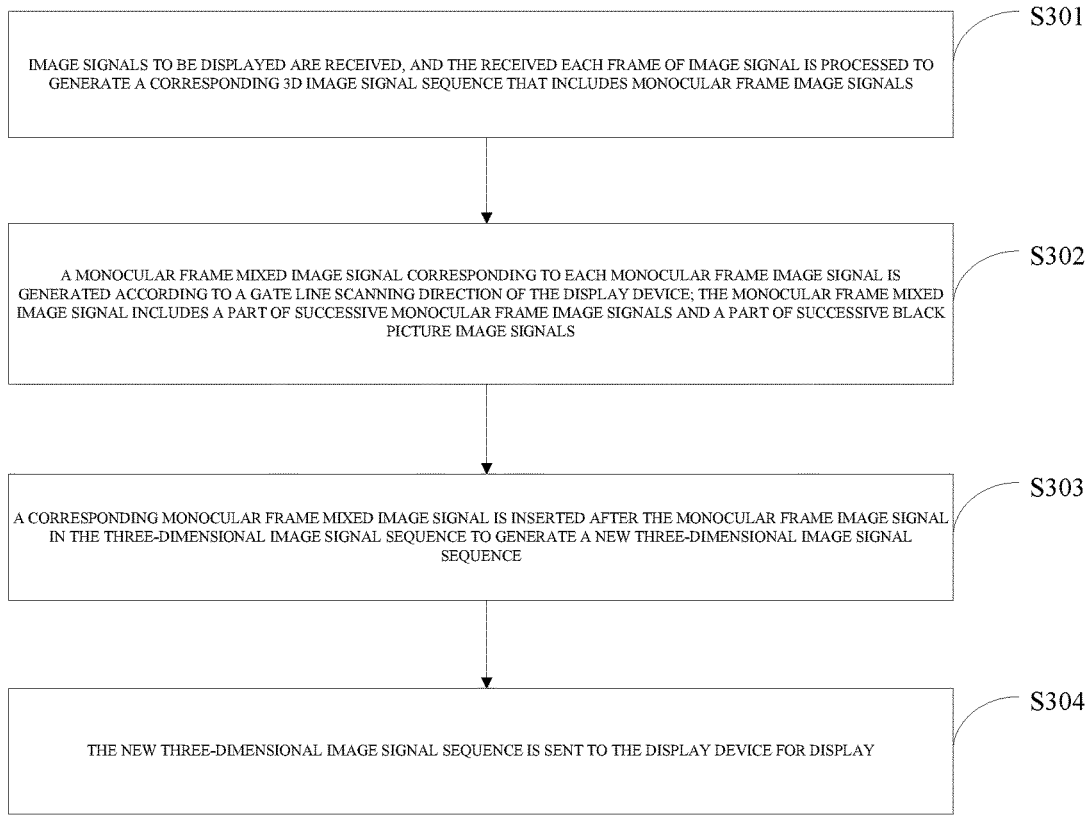
FIG. 3 is a flow chart of a method for processing shutter-type 3D image display provided in the First Embodiment of the present invention.

The First Embodiment of the present invention provides a method for processing shutter-type three-dimensional image display, as shown in FIG. 3, which may include steps S301 to S304.

In step S301, image signals to be displayed are received, and the received each frame of image signal is processed to generate a corresponding three-dimensional image signal sequence that includes monocular frame image signals.

In step S302, a monocular frame mixed image signal corresponding to each monocular frame image signal is generated according to a gate line scanning direction of the display device. Here, the monocular frame mixed image signal includes a part of successive monocular frame image signals and a part of successive black picture image signals. Preferably, the monocular frame mixed image signal only consists of a part of the successive monocular frame image signals and a part of the successive black picture image signals.

In step S303, a corresponding monocular frame mixed image signal is inserted after the monocular frame image signal in the three-dimensional image signal sequence to generate a new three-dimensional image signal sequence. Preferably, the corresponding monocular frame mixed image signal is inserted immediately after the monocular frame image signal in the three-dimensional image signal sequence.

In step S304, the new three-dimensional image signal sequence is sent to the display device for display.

In the above processing method for shutter-type three-dimensional image display provided in the First Embodiment of the present invention, as compared with the current processing method, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Various Modifications of the First Embodiment

To be specific, in specific implementation, in the above processing method provided in the First Embodiment of the present invention, 3D image signals may be received in step S301. And then, frequency multiplication processing is performed on the 3D image signals to generate a corresponding three-dimensional image signal sequence that includes monocular frame image signals. Optionally, 2D image signals may also be received in the step S301. The 2D image signals are firstly processed into 3D image signals, and then the 3D image signals are subjected to frequency multiplication processing to generate a three-dimensional image signal sequence that includes monocular frame image signals. The above mentioned is not limited hereto.

Furthermore, the above processing method provided in the First Embodiment of the present invention may be a real-time processing method. That is, once a frame of image signal to be displayed is received and processed, and the processed image signal is sent to the display device for display. Then, the next frame of image signal to be displayed is received, processed and sent, and so on. Obviously, the above processing method provided in the First Embodiment of the present invention may also be an off-line processing method. That is, all image signals to be displayed are received, all received image signals to be displayed are processed and then they are sent to the display device for display. The above mentioned is not limited hereto.

Preferably, in the above processing method provided in the First Embodiment of the present invention, the step of generating a monocular frame mixed image signal corresponding to each monocular frame image signal according to a gate line scanning direction of the display device may specifically include:

combining the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal. Herein, M is a number of gate lines in the display device, and N is a positive integer greater than or equal to 1 and smaller than M.

It should be pointed out that in the above processing method provided in the First Embodiment of the present invention, the monocular frame image signal refers to one of a left-eye image signal for displaying a left-eye image and a right-eye image signal for displaying a right-eye image. In addition, the monocular frame mixed image signal refers to one of a left-eye mixed image signal corresponding to the left-eye image signal and a right-eye mixed image signal corresponding to the right-eye image signal.

Figure 4A:
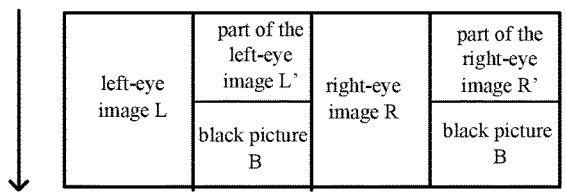
FIG. 4a and FIG. 4b are sequence charts of images when the processing methods provided in the embodiments of the present invention are respectively used for 3D display.

Preferably, in the above processing method provided in the First Embodiment of the present invention, when the gate line scanning direction of the display device is from top to bottom, according to the new three-dimensional image signal sequence (i.e., left-eye image signal, left-eye mixed image signal, right-eye image signal, and right-eye mixed image signal) received by the display device, it displays in sequence the left-eye image L, part of the left-eye image L'+black picture B (i.e., the upper portion of the display panel of the display device displays the corresponding the upper portion of the left-eye image, and the lower portion thereof displays the black picture), the right-eye image R, and part of the right-eye image R'+black picture B (i.e., the upper portion of the display panel of the display device displays the corresponding the upper portion of the right-eye image, and the lower portion thereof displays the black picture), as shown in FIG. 4a.

Figure 4B:
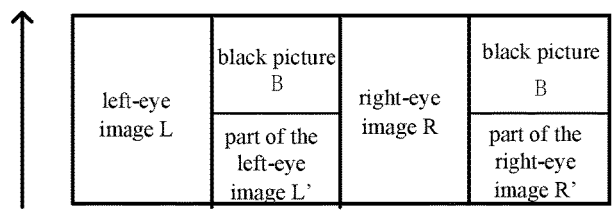

Preferably, in the above processing method provided in the First Embodiment of the present invention, when the gate line scanning direction of the display device is from bottom to top, according to the new three-dimensional image signal sequence (i.e., left-eye image signal, left-eye mixed image signal, right-eye image signal, and right-eye mixed image signal) received by the display device, it displays in sequence the left-eye image L, black picture B+part of the left-eye image L' (i.e., the upper portion of the display panel of the display device displays the black picture, and the lower portion thereof displays the corresponding the lower portion of the left-eye image), the right-eye image R, and part of the right-eye image R'+black picture B (i.e., the upper portion of the display panel of the display device displays the black picture, and the lower portion thereof displays the corresponding the lower portion of the right-eye image), as shown in FIG. 4b.

Preferably, in the above processing method provided in the First Embodiment of the present invention, the value of N is determined according to an actual crosstalk value and an actually required brightness evenness value of the display device.

Preferably, in specific implementation, in the above processing method provided in the First Embodiment of the present invention, for example, the generated new three-dimensional image signal sequence is: the left-eye image signal, left-eye image signals corresponding to the former N rows of gate lines along the gate line scanning direction of the display device+the black picture image signals corresponding to latter M−N rows of gate lines along the gate line scanning direction of the display device, the right-eye image signal, right-eye image signals corresponding to the former N rows of gate lines along the gate line scanning direction of the display device+the black picture image signals corresponding to latter M−N rows of gate lines along the gate line scanning direction of the display device.

When the selected value of N is small, i.e., the black picture image signals account for a larger portion in the monocular frame mixed image signal. Therefore, when the display device is displaying, when it starts to display the monocular frame image corresponding to the monocular frame image signal after displaying the monocular frame mixed image corresponding to the monocular frame mixed image signal, the liquid crystal in the upper portion of the display panel in the display device has already started to rotate, and the upper portion of the display panel displays a monocular image corresponding to the monocular image signal. Meanwhile, the liquid crystal in the lower portion of the display panel has not started to rotate yet, and the lower portion of the display panel still remains in the black picture image corresponding to the monocular frame mixed image signal of the last frame. Therefore, the overall brightness evenness of the display panel in the display device is poor.

As opposed to the above, when the selected value of N is large, i.e., the black picture image signals account for a smaller portion in the monocular frame mixed image signal. Therefore, when the display device is displaying, when it starts to display the monocular frame image corresponding to the monocular frame image signal after displaying the monocular frame mixed image corresponding to the monocular frame mixed image signal, the liquid crystal in the upper portion of the display panel in the display device has already started to rotate, and the upper portion of the display panel displays a monocular image corresponding to the monocular image signal. Meanwhile, the liquid crystal in the lower portion of the display panel has not started to rotate yet, and the lower portion of the display panel still remains in the monocular frame image corresponding to the monocular frame mixed image signal of the last frame and the bottommost black picture. Therefore, there will be small image crosstalk in the lower portion of the display panel in the display device, but the overall brightness evenness of the display panel in the display device is good.

Therefore, the value of N can be determined according to an actual crosstalk value and an actually required brightness evenness value of the display device. For example, when the display device is actually applied, the value of N can be increased if the brightness evenness is regarded to be more important than image crosstalk. As opposed to it, the value of N can be decreased if the brightness evenness is regarded to be less important than image crosstalk.

Preferably, the above processing method provided in the First Embodiment of the present invention may further include:

determining a shutter glasses control signal according to the new three-dimensional image signal sequence. The shutter glasses control signal is used to control the on-off state of the shutter glasses.

Furthermore, in specific implementation, when the display device displays a left-eye image corresponding to the left-eye image signal, the shutter glasses control signal controls the left lens of the shutter glasses to be turned on, and the right lens to be turned off. When the display device displays a right-eye image corresponding to the right-eye image signal, the shutter glasses control signal controls the right lens of the shutter glasses to be turned on, and the left lens to be turned off. When the display device displays the left(right)-eye mixed image picture corresponding to the left(right)-eye mixed image signal, the shutter glasses control signal controls the both the left and right lenses of the shutter glasses to be turned off.

Furthermore, in specific implementation, the timings for the shutter glasses control signal to control the shutter glasses to be turned on and turned off can be regulated according to the actual display conditions. No limitation is made herein.

Preferably, the above processing method provided in the First Embodiment of the present invention may further include:

determining a backlight module control signal according to the new three-dimensional image signal sequence. The backlight module control signal is used for controlling a turning-on time and a turning-on width of a sparkling backlight module in the display device.

Furthermore, in specific implementation, the backlight module control signal controls the sparkling backlight module in the display device to be turned on when the display device displays the monocular frame image corresponding to the monocular frame image signal. The backlight module control signal controls the sparkling backlight module in the display device to be turned off when the display device displays the monocular frame mixed image corresponding to the monocular frame mixed image signal.

Furthermore, in specific implementation, the timings for the backlight module control signal to control the sparkling backlight module in the display device to turned on and turned off can be regulated according to the actual display conditions. No limitation is made herein.

The Second Embodiment

Figure 5:
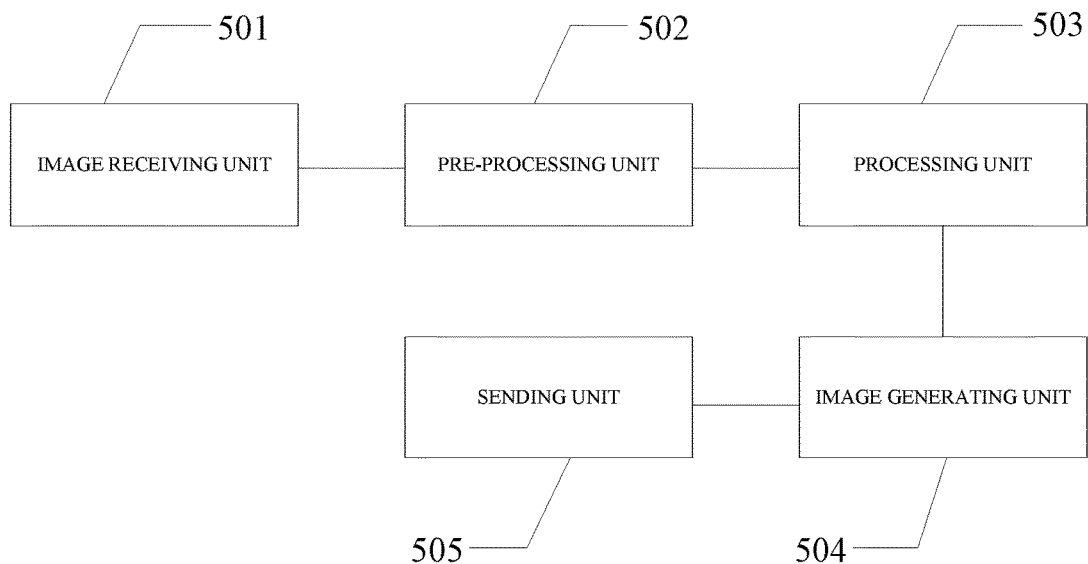
FIG. 5 illustrates the structure of a device for processing shutter-type 3D image display provided in the Second Embodiment of the present invention.

Based on the same inventive concept, the Second Embodiment of the present invention further provides a device for processing shutter-type three-dimensional image display. As shown in FIG. 5, the processing device specifically includes an image receiving unit 501, a pre-processing unit 502, a processing unit 503, an image generating unit 504 and a sending unit 505.

The image receiving unit 501 is used for receiving image signals to be displayed.

The pre-processing unit 502 is used for processing the received each frame of image signal to generate a corresponding three-dimensional image signal sequence that includes monocular frame image signals.

The processing unit 503 is used for generating a monocular frame mixed image signal corresponding to each monocular frame image signal according to a gate line scanning direction of the display device. Herein, the monocular frame mixed image signal includes a part of successive monocular frame image signals and a part of successive black picture image signals. Preferably, the monocular frame mixed image signal only includes a part of the successive monocular frame image signals and a part of the successive black picture image signals.

The image generating unit 504 is used for inserting a corresponding monocular frame mixed image signal after the monocular frame image signal in the three-dimensional image signal sequence to generate a new three-dimensional image signal sequence. Preferably, the corresponding monocular frame mixed image signal is inserted immediately after the monocular frame image signal in the three-dimensional image signal sequence.

The sending unit 505 is used for sending the new three-dimensional image signal sequence to the display device for display.

In the above device for processing shutter-type image display provided in the Second Embodiment of the present invention, as compared with the current processing device, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Various Modifications of the Second Embodiment

Preferably, in the above device for processing shutter-type image display provided in the Second Embodiment of the present invention, the processing unit 503 may be specifically used to:

combine the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal. Herein, M is a number of gate lines in the display device, and N is a positive integer greater than or equal to 1 and smaller than M.

Furthermore, when the above processing device provided in the the Second Embodiment of the present invention is used in cooperation with a display device, the processing device and the display device may be separately configured. In addition, the processing device may be provided within the display device. No limitation is made herein.

Preferably, the above device for processing shutter-type image display provided in the Second Embodiment of the present invention may further include:

a shutter glasses control unit used for determining a shutter glasses control signal according to the new three-dimensional image signal sequence, the shutter glasses control signal being used for controlling on-off state of shutter glasses. Herein, reference may be made to the First Embodiment for the specific control mode of the shutter glasses.

Preferably, the above device for processing shutter-type image display provided in the Second Embodiment of the present invention may further include:

a backlight module control unit for determining a backlight module control signal according to the new three-dimensional image signal sequence, the backlight module control signal being used for controlling a turning-on time and a turning-on width of a sparkling backlight module in the display device. Herein, reference may be made to the First Embodiment for the specific control mode of the backlight module.

The Third Embodiment

Figure 6:
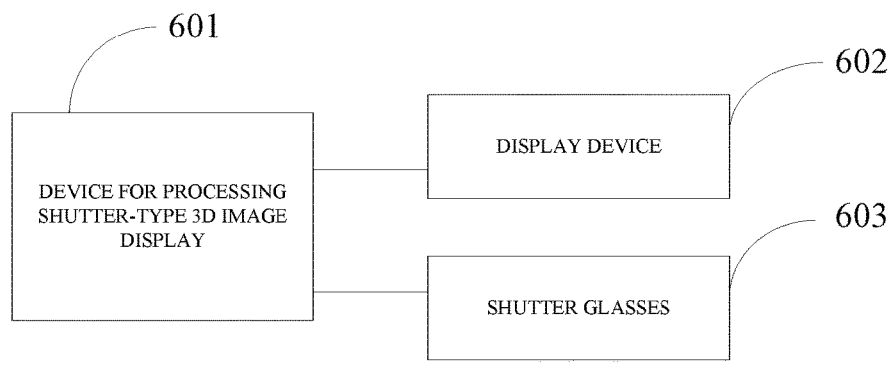
FIG. 6 illustrates the structure of a system for processing shutter-type 3D image display provided in the Third Embodiment of the present invention.

Based on the same inventive concept, the Third Embodiment of the present invention further provides a shutter-type three-dimensional image display system. As shown in FIG. 6, the system includes a device 601 for processing shutter-type three-dimensional image display and a display device 602.

The device 601 for processing shutter-type three-dimensional image display is used for receiving each frame of image signal to be displayed, and processing the received each frame of image signal to generate a corresponding three-dimensional image signal sequence that includes monocular frame image signals. The device 601 for processing shutter-type three-dimensional image display generates a monocular frame mixed image signal corresponding to each monocular frame image signal according to a gate line scanning direction of the display device. Herein, the monocular frame mixed image signal includes a part of successive monocular frame image signals and a part of successive black picture image signals. Preferably, the monocular frame mixed image signal only includes a part of the successive monocular frame image signals and a part of the successive black picture image signals. The device 601 for processing shutter-type three-dimensional image display inserts a corresponding monocular frame mixed image signal after the monocular frame image signal in the three-dimensional image signal sequence to generate a new three-dimensional image signal sequence. Preferably, the corresponding monocular frame mixed image signal is inserted immediately after the monocular frame image signal in the three-dimensional image signal sequence. Afterwards, the device 601 for processing shutter-type three-dimensional image display sends the new three-dimensional image signal sequence to the display device 602 for display.

The display device 602 is used for receiving the new three-dimensional image signal sequence sent by the device for processing shutter-type three-dimensional image display, and displaying according to the new three-dimensional image signal sequence.

In the above system for shutter-type three-dimensional image display provided in the Third Embodiment of the present invention, a corresponding monocular frame mixed image signal that includes a part of the successive monocular frame image signals and a part of the successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

Various Modifications of the Third Embodiment

Preferably, for the purpose of facilitating implementation, the above system provided in the Third Embodiment of the present invention, as shown in FIG. 6, may further include: shutter glasses 603.

The device 601 for processing shutter-type three-dimensional image display is further used to determine a shutter glasses control signal according to the new three-dimensional image signal sequence.

The shutter glasses 603 are used to receive the shutter glasses control signal sent by the device 601 for processing shutter-type three-dimensional image display, and control on-off switch of left and right lenses of the shutter glasses 603 according to the shutter glasses control signal.

Preferably, for the purpose of facilitating implementation, the above system provided in the Third Embodiment of the present invention, the device 601 for processing shutter-type three-dimensional image display is further used to determine the backlight module control signal according to the new three-dimensional image signal sequence.

The display device 602 is further used to receive the backlight module control signal sent by the device for processing shutter-type three-dimensional image display, and control a turning-on time and a turning-on width of a sparkling backlight module in the display device according to the backlight module control signal.

Furthermore, the display device 602 and shutter glasses 603 provided in each embodiment of the present invention may be used in pair or separately, or used in pair respectively with other shutter glasses and display devices. No limitation is made herein.

The Fourth Embodiment

The device for processing shutter-type three-dimensional image display provided in the Second Embodiment of the present invention may carry out the above method by using customized hardwired logic units, more than one application-specific integrated circuit or field-programmable gate array, firmware and/or program, computer software, etc. According to an embodiment, the above method may be carried out by a response processor of a computer system executing, for example, more than one instruction in a main memory. Such an instruction may be read into the main memory from a computer readable memory. Execution of a series of instructions in the main memory can implement various steps described in the present disclosure. In an alternative embodiment, a hardwired circuit may be used in combination with software to carry out the above method. Therefore, the embodiments of the present invention are not limited to any particular combination of hardware and software.

The Fifth Embodiment

The method for processing shutter-type three-dimensional image display provided in the First Embodiment of the present invention may be stored in a computer readable medium as a computer program. The computer readable medium herein refers to a medium that can provide data/programs for the computer to allow the computer to work. In an embodiment, various computer readable media are used to provide instructions for the processor. Such media may have various forms, for example, including but not limited to volatile and non-volatile storage media. A non-volatile storage media may include, for example, optical disks and magnetic disks. Volatile storage media may include, for example, dynamic memories. The general form of a computer readable medium may include floppy disks, rigid disks, magnetic disks, any other magnetic storage media, CD-ROM, any other optical storage media, RAM, PROM, EPROM, FLASH-EPROM, etc.

In conclusion, in the method, device, system, computer program and computer readable storage medium for processing shutter-type three-dimensional image display provided in each embodiment of the present invention, as compared with the prior art, a corresponding monocular frame mixed image signal that includes a part of successive monocular frame image signals and a part of successive black picture image signals is inserted after the monocular frame image signal. Therefore at the time of 3D image display, since the monocular frame mixed image signal includes part of the monocular frame image signals and part of the black picture image signals, the 3D image crosstalk phenomenon can be efficiently improved. Moreover, since the monocular frame mixed image signal only has part of the black picture image signals, a better brightness evenness can be obtained in display by reducing the proportion of the black picture image signals in the monocular frame mixed image signal.

The above descriptions are merely specific embodiments of the present invention, but the protection scope of the present invention is not limited thereto. Any variation or replacement that can be readily conceived by a person having ordinary skill in the art within the technical scope disclosed in the present invention shall fall into the protection scope of the present invention. Therefore, the protection scope of the present invention shall be defined by the claims.

What is claimed is:

1. A device for processing shutter-type three-dimensional (3D) image display of a display device, comprising:
   a receiving circuit to receive each frame of image signal to be displayed;
   a pre-processing circuit to receive each frame of the image signal to be displayed from the receiving circuit, and to process the received each frame of image signal to generate a corresponding 3D image signal sequence that includes monocular frame image signals;
   a processing circuit which is used to receive the generated 3D image signal sequence from the pre-processing circuit, and to generate a monocular frame mixed image signal corresponding to each monocular frame image signal according to a gate line scanning direction of the display device, wherein the monocular frame mixed image signal includes a part of successive monocular frame image signals and a part of successive black picture image signals;
   an image generating circuit to receive the generated monocular frame mixed image signal from the processing circuit, and to insert a corresponding monocular frame mixed image signal after the monocular frame image signal in the 3D image signal sequence to generate a new 3D image signal sequence; and
   a sending circuit to receive the generated new 3D image signal sequence from the image generating circuit, and to send the generated new 3D image signal sequence to the display device for display,
   wherein when a gate line scanning direction of the display device is from top to bottom, the processing circuit is used to combine the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal, wherein the black picture image signals corresponding to latter M−N rows of gate lines do not contain any substantive image information, or when a gate line scanning direction of the display device is from bottom to top, the processing circuit is used to combine the black picture image signals corresponding to former N rows of gate lines along the gate line scanning direction with the monocular frame image signals corresponding to latter M−N rows of gate lines along the gate line scanning direction to generate the monocular frame mixed image signal corresponding to the monocular frame image signal, wherein the black picture image signals corresponding to former N rows of gate lines do not contain any substantive image information,
   where M is a number of gate lines in the display device, and N is a positive integer greater than or equal to 1 and smaller than M.

2. The device according to claim 1, further comprising:
   a shutter glasses control circuit to determine a shutter glasses control signal according to the new 3D image signal sequence, the shutter glasses control signal being used for controlling on-off state of shutter glasses.

3. The device according to claim 1, further comprising:
   a backlight module control circuit to determine a backlight module control signal according to the new 3D image signal sequence, the backlight module control signal being used for controlling a turning-on time and a turning-on width of a sparkling backlight module in the display device.

4. The device according to claim 1, wherein
   the monocular frame mixed image signal only includes a part of the successive monocular frame image signals and a part of the successive black picture image signals.

5. The device according to claim 1, wherein
   a corresponding monocular frame mixed image signal is inserted immediately after the monocular frame image signal in the 3D image signal sequence.

6. A method for processing shutter-type three-dimensional (3D) image display of a display device, comprising:
   receiving each frame of image signal to be displayed, and processing the received each frame of image signal to generate a corresponding 3D image signal sequence that includes monocular frame image signals;
   generating a monocular frame mixed image signal corresponding to each monocular frame image signal according to a gate line scanning direction of the display device, wherein the monocular frame mixed image signal includes a part of successive monocular frame image signals and a part of successive black picture image signals;
   inserting a corresponding monocular frame mixed image signal after the monocular frame image signal in the 3D image signal sequence to generate a new 3D image signal sequence; and
   sending the new 3D image signal sequence to the display device for display,
   wherein when a gate line scanning direction of the display device is from top to bottom, the step of generating a monocular frame mixed image signal corresponding to each monocular frame image signal according to a gate line scanning direction of the display device comprises:
   combining the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal, wherein the black picture image signals corresponding to latter M−N rows of gate lines do not contain any substantive image information, or when a gate line scanning direction of the display device is from bottom to top, the step of generating a monocular frame mixed image signal corresponding to each monocular frame image signal according to a gate line scanning direction of the display device comprises: combining the black picture image signals corresponding to former N rows of gate lines along the gate line scanning direction with the monocular frame image signals corresponding to latter M−N rows of gate lines along the gate line scanning direction to generate the monocular frame mixed image signal corresponding to the monocular frame image signal, wherein the black picture image signals corresponding to former N rows of gate lines do not contain any substantive image information, where M is a number of gate lines in the display device, and N is a positive integer greater than or equal to 1 and smaller than M.

7. The method according to claim 6, further comprising: determining a shutter glasses control signal according to the new 3D image signal sequence, the shutter glasses control signal being used for controlling on-off state of shutter glasses.

8. The method according to claim 6, further comprising: determining a backlight module control signal according to the new 3D image signal sequence, the backlight module control signal being used for controlling a turning-on time and a turning-on width of a sparkling backlight module in the display device.

9. The method according to claim 6, wherein the monocular frame mixed image signal only includes a part of the successive monocular frame image signals and a part of the successive black picture image signals.

10. The method according to claim 6, wherein a corresponding monocular frame mixed image signal is inserted immediately after the monocular frame image signal in the 3D image signal sequence.

11. A system for processing shutter-type three-dimensional (3D) image display of a display device, comprising: a device for processing shutter-type 3D image display of the display device, comprising: a receiving circuit to receive each frame of image signal to be displayed; a pre-processing circuit to receive each frame of the image signal to be displayed from the receiving circuit, and to process the received each frame of image signal to generate a corresponding 3D image signal sequence that includes monocular frame image signals; a processing circuit which is used to receive the generated 3D image signal sequence from the pre-processing circuit, and to generate a monocular frame mixed image signal corresponding to each monocular frame image signal according to a gate line scanning direction of the display device, wherein the monocular frame mixed image signal includes a part of successive monocular frame image signals and a part of successive black picture image signals; an image generating circuit to receive the generated monocular frame mixed image signal from the processing circuit, and to insert a corresponding monocular frame mixed image signal after the monocular frame image signal in the 3D image signal sequence to generate a new 3D image signal sequence; and a sending circuit to receive the generated new 3D image signal sequence from the image generating circuit, and to send the generated new 3D image signal sequence to the display device for display; and a display device used for receiving the new 3D image signal sequence sent by the device for processing shutter-type 3D image display, and displaying according to the new 3D image signal sequence, wherein when a gate line scanning direction of the display device is from top to bottom, the device for processing shutter-type 3D image display is used to combine the monocular frame image signals corresponding to former N rows of gate lines along the gate line scanning direction with the black picture image signals corresponding to latter M−N rows of gate lines along the gate line scanning direction to generate the monocular frame mixed image signal corresponding to the monocular frame image signal, wherein the black picture image signals corresponding to latter M−N rows of gate lines do not contain any substantive image information, or when a gate line scanning direction of the display device is from bottom to top, the device for processing shutter-type 3D image display is used to combine the black picture image signals corresponding to former N rows of gate lines along the gate line scanning direction with the monocular frame image signals corresponding to latter M−N rows of gate lines along the gate line scanning direction to generate the monocular frame mixed image signal corresponding to the monocular frame image signal, wherein the black picture image signals corresponding to former N rows of gate lines do not contain any substantive image information, where M is a number of gate lines in the display device, and N is a positive integer greater than or equal to 1 and smaller than M.

12. The system according to claim 11, further comprising: shutter glasses;

wherein the device for processing shutter-type 3D image display further comprises a shutter glasses control circuit to determine a shutter glasses control signal according to the new 3D image signal sequence, the shutter glasses control signal being used for controlling on-off state of shutter glasses; and the shutter glasses are used to receive the shutter glasses control signal sent by the shutter glasses control circuit, and control on-off switch of left and right lenses of the shutter glasses according to the shutter glasses control signal.

13. The system according to claim 11, wherein the device for processing shutter-type 3D image display further comprises a backlight module control circuit to determine a backlight module control signal according to the new 3D image signal sequence, the backlight module control signal being used for controlling a turning-on time and a turning-on width of a sparkling backlight module in the display device; and the display device is further used to receive the backlight module control signal sent by the backlight module control circuit, and control a turning-on time and a turning-on width of a sparkling backlight module in the display device according to the backlight module control signal.

14. The system according to claim 11, wherein the monocular frame mixed image signal only includes a part of the successive monocular frame image signals and a part of the successive black picture image signals; and a corresponding monocular frame mixed image signal is inserted immediately after the monocular frame image signal in the 3D image signal sequence.

* * * * *